No. 832,584. PATENTED OCT. 9, 1906.
A. E. BILBY.
BELT SUPPORT.
APPLICATION FILED SEPT. 18, 1905.

Witnesses
Fred A. Duncan
J. A. Walsh

Inventor
Alva E. Bilby
By
Bradford & Hood,
Attorneys.

UNITED STATES PATENT OFFICE.

ALVA E. BILBY, OF FAIRVIEW TOWNSHIP, FAYETTE COUNTY, INDIANA, ASSIGNOR TO ALBERT M. HARRIS, OF SOUTH BEND, INDIANA.

BELT-SUPPORT.

No. 832,584.　　　Specification of Letters Patent.　　　Patented Oct. 9, 1906.

Application filed September 18, 1905. Serial No. 278,973.

*To all whom it may concern:*

Be it known that I, ALVA E. BILBY, a citizen of the United States, residing at Fairview township, in the county of Fayette and State of Indiana, have invented certain new and useful Improvements in Belt-Supports, of which the following is a specification.

In the operation of threshing grain, as is well known, the threshing-machine or separator is commonly driven by a traction-engine, which engine (in use) is positioned at a considerable distance from the separator, so that a long belt is used. In "setting" the threshing rig it is necessary that the band or driving wheel on the engine shall be "lined up" with the main pulley on the cylinder-shaft of the separator and also that the engine shall be accurately positioned that distance from the separator which shall equal the length of the belt when said belt is under proper tension for the required work. This positioning has usually been done by first setting the separator at the point desired and then backing the engine until the band-wheel or driving-pulley thereon bears properly within and against the belt. This is a difficult operation, and the belt is frequently thrown off repeatedly before said operation is successfully performed, as the said pulley being in motion necessarily imparts its motion to the belt before the proper position is quite reached.

The object of my said invention is to provide a means by which the belt may be held from travel until the engine is properly positioned; and said invention consists in a suitable band or strip adapted to be placed around the band wheel or pulley and then so secured to an adjacent device as to prevent it from being driven with or by means of said pulley.

Figure 1:
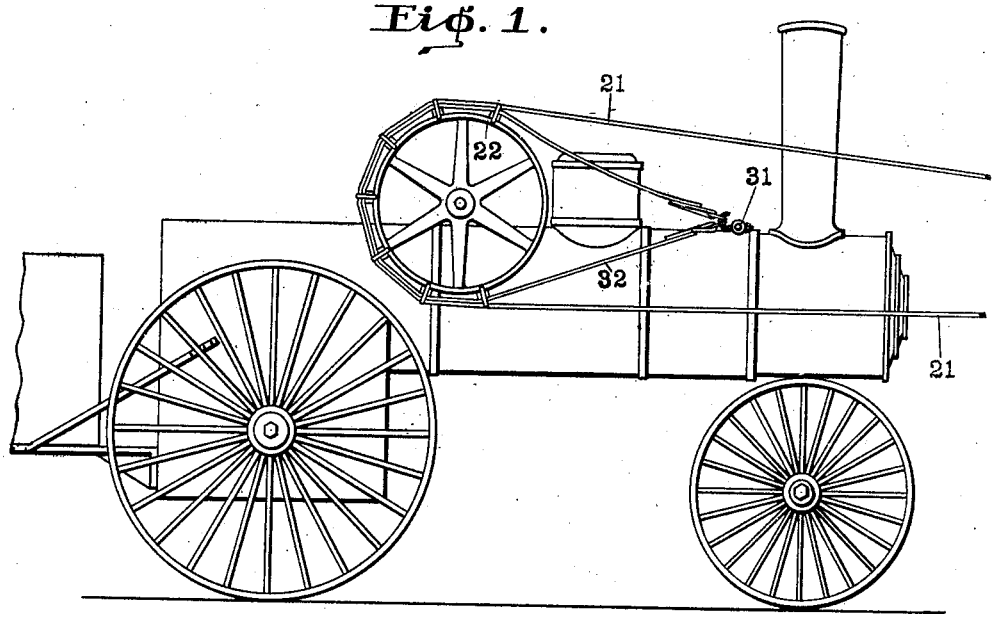
Figure 2:
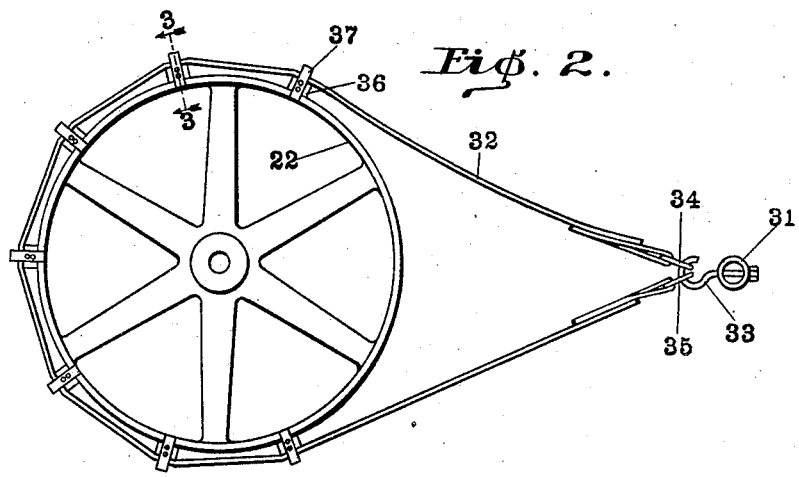
Figure 3:
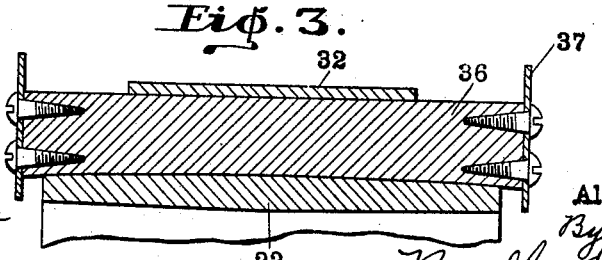

In the accompanying drawings, Figure 1 is a side elevation of a traction-engine and a fragment of a main driving-belt (such as is employed for driving a threshing-machine therefrom) with a device embodying my said invention interposed between the fly-wheel of the engine and said belt; Fig. 2, a view, on a larger scale, of the fly-wheel and the said device separately; and Fig. 3 a detail transverse sectional view of the belt-support.

The engine and the belt are, or may be, of any usual or desired form or construction and not being peculiar to my invention will not be further described herein except incidentally in describing said invention.

The belt 21 is ordinarily driven from the band wheel or pulley 22 in a common well-known manner. My improved belt-support consists of an arm 31, secured in any convenient way to a suitable point on the body of the engine, and extends out substantially parallel with the shaft on which the belt-pulley is mounted. A flexible band or strip 32 extends from this arm around the pulley, the ends of said band being detachably connected to said arm. I have shown the means of attachment between the strip and the arm as consisting of a hook 33 on the arm and rings 34 and 35 on the ends of the strip. Any suitable means may, however, be of course employed. That side of said strip which comes in contact with the pulley is armed with transverse cleats 36. These cleats should preferably be of such size and so spaced as to keep the strip itself from contact with the face of the pulley. Guards 37 are secured to the ends of said cleats, so as to prevent the strip from slipping sidewise off said pulley, and these may also be extended up so as to guard the belt 21 from being accidentally displaced from its position on said strip when the device is in use, although I do not regard this as particularly necessary, as there is little danger of such displacement in any event.

In use I first position the threshing-machine or separator in the ordinary and well-known manner. I then run the engine to near its final position, as is usual; but before putting on the belt I put my improved belt-support in position, as shown in the drawings. I then put on the belt in the usual way, except that the belt rests on the outside of the support instead of directly on the driving-pulley of the engine. I then run the engine to its final position, and after this is done I detach the belt-support from the arm. Then when the engine is started up the belt-support will run off from the belt-pulley and drop onto the ground, and the rig is ready to run in the usual manner.

Having thus fully described my said invention, what I claim as new, and desire to secure by Letters Patent, is—

1. The combination of a belt-pulley, a belt, a belt-support comprising a flexible strip adapted to be passed around the belt-pulley and in engagement therewith and adapted to receive and support a belt embracing said pulley, and a device to which one end of said strip may be readily detachably connected whereby the pulley may be rotated inside of the strip when said strip is held against movement, and the rotation of the pulley will eject the strip from between it and the belt when the strip is released.

2. The combination, with the belt-pulley of a traction-engine, and the belt driven thereby, of a belt-support for carrying the belt while the engine is being positioned said support comprising a flexible strip adapted to be placed on the belt-pulley, and an arm carried by the engine to which one of the ends of said strip may be detachably connected.

3. The combination, with a belt-pulley, of a belt-support comprising a flexible strip, cleats secured to said strip and adapted to come into immediate contact with the pulley, and a stationary support to which one of the ends of said strip may be detachably connected.

4. The combination, with a belt-pulley, of a belt-support comprising a flexible strip, cleats secured to said strip and adapted to come into immediate contact with the pulley, guards on the ends of said cleats, and a stationary support to which one of the ends of said strip may be detachably connected.

5. As an article of manufacture, a flexible strip adapted to embrace a running pulley and to support a belt also embracing the pulley, said strip provided at one of its ends with means by which it may be readily detachably held against rotation with the pulley.

6. As an article of manufacture, a flexible strip carrying upon one face transverse wearing-cleats adapted to engage and be supported by the face of a pulley, and also provided at one end with means by which it may be readily detachably held against movement with the pulley, said flexible strip having its outer face adapted to receive and support a belt embracing the pulley with which the strip may be associated.

7. A device of the class described comprising a flexible strip, a plurality of transverse wearing-cleats carried by one face of said strip, guards carried by said strip and projecting beyond the two faces thereof to engage a pulley embraced by the strip, and also to engage a belt embracing the strip, and means carried by one end of the strip by means of which it may be held against movement with the pulley.

8. A device of the class described comprising a flexible strip adapted to embrace a pulley, means by which said strip may be held against movement with the pulley, and guards carried at the edges of said strip, said guards projecting beyond each face of the strip to engage an embraced pulley at one end and an embracing-belt at the other end.

In witness whereof I have hereunto set my hand and seal, at Indianapolis, Indiana, this 11th day of September, A. D. 1905.

ALVA E. BILBY. [L. S.]

Witnesses:
CHESTER BRADFORD,
JAMES A. WALSH.